United States Patent

[11] 3,571,660

| [72] | Inventor | Harold J. Phillips<br>Clearwater, Fla. |
|---|---|---|
| [21] | Appl. No. | 781,858 |
| [22] | Filed | Dec. 6, 1968 |
| [45] | Patented | Mar. 23, 1971 |
| [73] | Assignee | Honeywell Inc.<br>Minneapolis, Minn. |

[54] VOLTAGE REGULATING CIRCUIT
8 Claims, 1 Drawing Fig.

| [52] | U.S. Cl. | 317/16,<br>317/50 |
|---|---|---|
| [51] | Int. Cl. | H02h 3/20 |
| [50] | Field of Search | 317/31, 33,<br>50, 16 |

[56] References Cited
UNITED STATES PATENTS

| 3,375,405 | 3/1968 | Fallon | 317/31 |
|---|---|---|---|
| 3,475,653 | 10/1969 | Odenberg | 317/31 |
| 3,480,832 | 11/1969 | Person | 317/31 |

*Primary Examiner*—Harold Broome
*Attorneys*—Charles J. Ungemach, Ronald T. Reiling and James A. Phillips

ABSTRACT: A circuit for providing protection against power line high voltage surges is described. A sensor such as a Zener diode is used to detect the high voltage surge and triggers one of two silicon controlled rectifiers. The silicon controlled rectifiers are connected from the output of the protection circuit to the opposite sides of the power line to connect the output of the circuit to the negative side of the power line input during the high voltage surge.

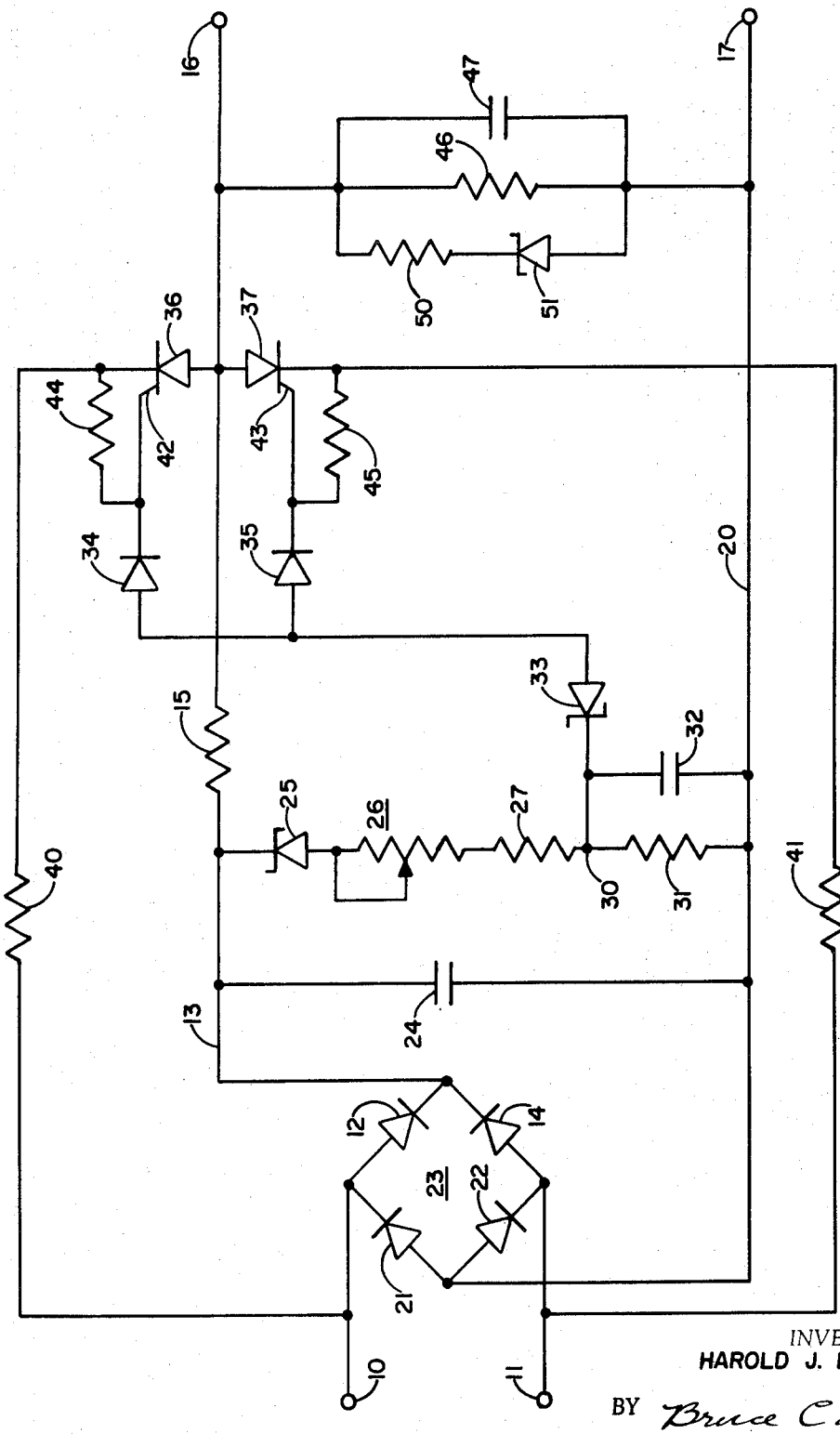

VOLTAGE REGULATING CIRCUIT

BACKGROUND OF THE INVENTION

In many systems it is necessary to provide protection against high voltage surges which may occur on power lines. Generally, a protection circuit may use transformers, series regulators, or silicon controlled rectifier regulators. The transformer type regulator or protection circuit requires large volume especially where high voltages may be encountered. The series regulators are limited in capacitor charge surge current capability and generally require high voltage transistors. Transistors with high voltage and power capabilities are not readily available. Silicon controlled rectifier regulators are noisy and are not always capable of suppressing a voltage surge of long duration such as surges which have a duration of greater than one-half cycle of the power signal.

SUMMARY OF THE INVENTION

This invention provides a circuit capable of overcoming the above deficiencies of the prior art. The circuit is capable of suppressing high voltage surges even when such surges have a relatively long duration. A protection circuit constructed in accordance with this invention has a voltage sensing device such as a Zener diode connected across the source voltage to detect when a voltage surge occurs. Two current control devices such as silicon controlled rectifiers (SCRs) are devices from the output of the circuit to the input and have their control electrodes connected to the output of the sensing circuit which includes the sensing device. When an overvoltage occurs, one of the SCRs is switched ON to connect the output of the circuit to the power line input TO suppress the excess voltage. Two SCRs are necessary if protection is to be provided against both positive and negative voltage surges. There is also a voltage divider consisting of three resistors included in this circuit. One resistor is connected between the circuit input and the SCRs and the other two resistors are connected between the outputs of the two SCRs and the power line.

The advantages of this circuit are generally that there is low power loss since there is no current drain until a voltage surge occurs. In a series type regulator there is a constant power drain since the series transistor is operating at all times. Another advantage of this invention is that the protection circuit operates only during a voltage surge on the power line. Accordingly, it is an object of this invention to provide a new and novel circuit for protection against voltage surges on a power line.

This object and other objects and advantages of this invention will become evident to those skilled in the art upon a reading of this specification and the appended claims in conjunction with the accompanying drawing of which the single FIGURE is a schematic diagram of one embodiment of this invention. DETAILED DESCRIPTION OF THE INVENTION Referring now to the drawing, there is shown two input means or terminals 10 and 11. Terminal 10 is connected to the anode of a diode 12 which has a cathode connected to a line, lead, or conductor 13. Terminal 11 is connected to the anode of a diode 14 which also has its cathode connected to conductor 13. Conductor 13 is connected to one end of a resistance means or resistor 15 which has its other end connected to an output terminal 16. A second output terminal 17 provides a DC return for the output voltage. Terminal 17 is connected by means of a line, lead, or conductor 20 to the anode of a diode 21 which has its cathode connected to input terminal 10. Conductor 20 is further connected to the anode of a diode 22 which has its cathode connected to input terminal 11. Diodes 12, 14, 21, and 22 comprise a full wave rectifying bridge 23. Conductor 20 is a common conductor and in some cases may be ground. A capacitor 24 is connected between conductors 13 and 20 to smooth the DC output of rectifying bridge 23.

Conductor 13 is connected to the cathode of a sensing means, voltage sensing means, or Zener diode 25 which has its anode connected to one end of a potentiometer 26. The other end of potentiometer 26 is connected by means of a resistor 27 to a terminal 30. Terminal 30 is connected by means of a parallel combination of a resistor 31 and a capacitor 32 to conductor 20. Terminal 30 is further connected to the cathode of a Zener diode 33. The anode of Zener diode 33 is connected to the anodes of a pair of isolation diodes 34 and 35.

Output terminal 16 is connected to the anodes of two switching means, controlled switching means, controlled rectifier means, or SCRs 36 and 37. The cathode of SCR 36 is connected to one end of a resistance means or resistor 40, the other end of which is connected to input terminal 10. The cathode of SCR 37 is connected to one end of a resistance means or resistor 41, the other end of which is connected to a control electrode 42 of SCR 36. The cathode of diode 35 is connected to a control electrode 43 of SCR 37. A cathode-gate biasing resistor 44 is connected between control electrode 42 and the cathode of SCR 36. Another cathode-gate biasing resistor 45 is connected between control electrode 43 and the cathode of SCR 37.

Output terminal 16 is connected to output terminal 17 by means of a parallel combination of a resistor 46 and a capacitor 47. Output terminal 16 is further connected to output terminal 17 by means of a serial combination of a resistor 50 and a Zener diode 51 which has its anode connected to output terminal 17. Resistor 46 and capacitor 47 comprise a filter to filter the output of the voltage protection circuit. Resistor 50 and Zener diode 51 comprise a loading circuit which may or may not be necessary depending upon the load connected between output terminal 16 and 17. These components provide loading during turn on when the circuit is being used to provide power to an inductive load.

To understand the operation of this invention assume that an alternating voltage is provided between terminals 10 and 11. This alternating voltage is rectified by rectifying circuit 23 so that a generally DC voltage appears between conductors 13 and 20. Capacitor 24 filters or smooths this voltage. The voltage on conductor 13 is coupled through resistor 15 to output terminal 16 and hence to whatever load is connected between terminal 16 and 17. Resistor 15 provides a current limiting function. As long as no overvoltages occur, Zener diode 25 will not conduct current Hence, SCRs 36 and 37 will remain OFF.

When an overvoltage occurs, Zener diode 25 will conduct current in the reverse direction This current will flow from conductor 13 through Zener diode 25, potentiometer 26, resistor 27, and the parallel combination of resistor 31 and capacitor 32 to conductor 20. The potential at terminal 30 will rise thereby causing Zener diode 33 to conduct current in a reverse direction. Current flowing through Zener diode 33 will also flow through one of diodes 34 or 35 to either control electrode 42 or control electrode 43. Assume that terminal 11 is negative with respect to terminal 10. Since terminal 10 is positive, SCR 36 cannot conduct current and accordingly will remain OFF. However, since terminal 11 is negative, SCR 37 will switch ON and will begin conducting current. The current path is from input terminal 10 through diode 12, resistor 15, SCR 37, and resistor 41 to input terminal 11. Thus, the conduction of SCR 37 makes a connection between the output of the voltage surge protection circuit and the power line to suppress the voltage surge.

If terminal 10 is negative with respect to terminal 11 at the time a voltage surge occurs, SCR 36 will conduct and SCR 37 will remain OFF. The conduction path when SCR 36 is conducting is from terminal 11 through diode 14, resistor 15, SCR 36, and resistor 42 to terminal 10. It should be noted that if the voltage surge lasts for more than one-half cycle of the input power signal, this circuit will suppress the entire surge.

The purpose of potentiometer 26 is to adjust the firing point of SCRs 36 and 37. The purpose of capacitor 32 and Zener diode 33 is to suppress noise and to prevent SCRs 36 and 37 from triggering due to noise. The purpose of diodes 34 and 35 is to prevent SCRs 36 and 37 from being self biased ON. Resistor 15 together with resistors 40 and 41 comprise a voltage divider. When either SCR 36 or 37 is conducting, there is a very low volt drop across the SCR. For example, if SCR 36 is conducting, output terminal 16 would be essentially connected directly to resistor 40 and therefore providing an AC return path. Resistor 40, therefor, maintains the output voltage at the proper level and limits the amount of current flowing through SCR 36. Also, at the time when SCR 36 is conducting there is a high voltage on conductor 13. The current flowing through resistor 15, SCR 36, and resistor 40 causes the voltage on conductor 13 to be divided between resistors 15 and 40 so that the voltage at output terminal 16 is within the proper limits. Resistor 41 provides the same function as resistor 40 when SCR 37 is conducting. The value of resistors 15, 40, and 41 is dictated by the magnitude of the possible overvoltage or voltage surge and the maximum permissible output voltage.

In one application of this invention it was necessary to suppress potential voltage surges of twice the normal line voltage amplitude. In this application the following component values were used successfully:

| Component | Value |
|---|---|
| Zener diode 33 | 5 volts |
| resistors 15, 40, and 41 | 10 ohms |
| resistors 27, 31, 44, and 45 | 1,000 ohms |
| potentiometer 26 | 10,000 ohms |
| capacitor 32 | 0.01 microfarads |

The values of these components will vary depending upon the magnitude of the normal power line voltage and the possible magnitude and duration of a voltage surge. Also, the voltage to which it is desired to limit the output voltage must be taken into account when determining the value of resistors 15, 40, and 41.

While I have shown and described one embodiment of my invention, those skilled in the art will realize that many variations and modifications can be made to produce a device outside the exact circuit shown in this specification and still be within the spirit and scope of my claimed invention.

I claim:

1. Circuit protection apparatus comprising:
   first and second power terminals for supplying a voltage therebetween;
   output means for supplying an output voltage;
   means connecting said first and second power terminals to said output means;
   sensing means connected to said means connecting said first and second power terminals to said output means for sensing overvoltage conditions and for providing an output signal in response to an overvoltage condition;
   first switching means connected between said output means and said first power terminal for completing a circuit between said output means and said first power terminal when the voltage between said first and second power terminals is of a first sense;
   second switching means connected between said output means and said second power terminal for completing a circuit between said output means and said second power terminal when the voltage between said first and second power terminals is of a second sense; and
   means connecting said sensing means to said first and second switching means for switching said first or second switching means to a conducting condition when an overvoltage occurs.

2. Circuit protection apparatus as defined in claim 1 wherein said means connecting said first and second power terminals to said output means includes a rectifying means for rectifying alternating voltage provided at said first and second power terminals.

3. Circuit protection apparatus as defined in claim 1 wherein said means connecting said first and second power terminals to said output means includes first resistive means connected between said sensing means and said first and second switching means and wherein second and third resistive means are connected between said first and second switching means, respectively, and said first and second power terminals, respectively.

4. Circuit protection apparatus as defined in claim 1 wherein said means connecting said first and second power terminals to said output means includes a rectifying means for rectifying alternating voltage provided at said first and second power terminals and further includes first resistive means connected between said sensing means and said first and second switching means and wherein second and third resistive means are connected between said first and second switching means, respectively, and said first and second power terminals, respectively.

5. Circuit protection apparatus as defined in claim 4 wherein said sensing means includes a Zener diode and said first and second switching means are controlled rectifiers having their control electrodes connected to said sensing means.

6. Apparatus for providing protection against excessive voltages comprising, in combination:
   input means for accepting an alternating input voltage;
   rectifying means connected to said input means for rectifying said alternating input voltage;
   sensing means connected to an output of said rectifying means for sensing when excessive voltages occur;
   output means for providing a generally direct output voltage;
   first resistive means connected between said rectifying means and said output means;
   first controlled rectifier means connected in series with a second resistive means between said output means and said input means;
   second controlled rectifier means connected in series with a third resistive means between said output means and said input means; and
   means connecting said sensing means to control electrodes of said first and second controlled rectifier means for alternatively switching said first or second controlled rectifier means to a conducting condition when an overvoltage occurs.

7. Apparatus as defined in claim 6 wherein said rectifying means is a full wave rectifying means.

8. Apparatus as defined in claim 7 wherein said sensing means includes a Zener diode.